United States Patent [19]

Maszalec

[11] Patent Number: 4,582,537
[45] Date of Patent: * Apr. 15, 1986

[54] ELASTOMERIC COMPRESSIBLE METALLIC MIXTURE

[76] Inventor: Judith A. Maszalec, 464 Riverside Ave., Rutherford, N.J. 07070

[*] Notice: The portion of the term of this patent subsequent to Feb. 19, 2002 has been disclaimed.

[21] Appl. No.: 672,832

[22] Filed: Nov. 19, 1984

[51] Int. Cl.⁴ .............................................. B22F 7/00
[52] U.S. Cl. .............................................. 75/252
[58] Field of Search ................................... 75/252

[56] References Cited

U.S. PATENT DOCUMENTS 3,723,165  3/1973  Longo et al. .................... 75/252
4,000,982  1/1977  Ueda ................................ 75/252

*Primary Examiner*—Wayland Stallard
*Attorney, Agent, or Firm*—Ralph R. Roberts

[57] ABSTRACT

This invention provides an elastomeric compressible mixture having the compressible properties of a rubber or rubber-like compound with the heat characteristics of a conductive metal member. This compound material is made of two parts tetrafluoro ethylene powder and the remainder about seventy-five parts of heat-conductive metal powder such as aluminum powder and twenty-five parts silicone rubber. This compound is attached as a flat sheet to a conductive metal backup member or may be a cover for a conductive metal roll. This mixture is used to accommodate irregular thicknesses of thermoplastic films. This elastomeric mixture as a material is used with heat and pressure to effect a seal of the heated thermoplastic film to an adjacent film.

12 Claims, 2 Drawing Figures

ELASTOMERIC COMPRESSIBLE METALLIC MIXTURE

CROSS-REFERENCE TO RELATED APPLICATION

This application pertains to subject matter shown, described and claimed in my U.S. patent application Ser. No. 569,523, filed Jan. 9, 1984, now U.S. Pat. No. 4,500,353, and entitled "ELASTOMERIC COMPRESSIBLE METALLIC MIXTURE." This application identifies the metallic powder components as metals having efficiency of heat conductivity and, rather than a release component as being only polymerized tetrafluoro ethylene, newly-developed chemical materials having very like properties as to release characteristics are noted.

BACKGROUND OF THE INVENTION

1. Field of the Invention

With reference to the classification of art as established in and by the United States Patent Office, this invention is believed to be found in the chemical art of mixed components and particularly for compounds of elastomeric base compound mixed with heat-conductive metal powder and a release plastic.

2. Description of the Prior Art

The use of rubber and rubber-like materials as a resilient covering for rolls or sheets is well known. The particular compounds such as rubber or rubber-like materials have been used for resilient facing for and against rolls or opposite cutting knives. This rubber or rubber-like material is usually a mid-durometer range, but may be as stiff as that used for tire-tread compounds. The stiffening of rubber or rubber-like material is usually with a mixing with clays or similar material which adds a body or filler to the initial resiliency of the product. Rubber or rubber-like compounds are well known as being non-conductors (heat barriers) of heat and provide insulation-like properties. These properties are not desirable for adhering together of partially-melted or heat-softened plastic material such as films used as plies of material.

So far as is known, a formulated and compounded mixture utilizing a rubber-like component, heat-conductive metal powder and a small additional component of polymerized tetrafluoro ethylene is not known. This compound provides not only elastomeric properties but thermoconductivity, and the tetrafluoro ethylene powder, which is a small (2%) portion of the compound, provides the desired release properties.

SUMMARY OF THE INVENTION

This invention may be summarized, at least in part, with reference to its object. It is an object of this invention to provide, and it does provide, an elastomeric mixture in which heat-conducting metal powder is a major ingredient, rubber or rubber-like material is a minor ingredient, and polymerized tetrafluoro ethylene powder is also an additive to provide release properties to the compound. The thermoconductivity is provided by the presence of powder in the mixture. Release as a property is provided by powder. Heat-conducting metal powder is noted in several handbooks and aluminum powder is a good heat conductor and inexpensive. Antimony is about ten percent as effective, and brass, both red and yellow, is about three-quarters as effective as aluminum powder. Copper is about twice and German silver is about one-fourth. Iron is about two-fifths, with lead about one-fifth. Silver is about three times as effective, with tin about two-fifths, and zinc about four-fifths that for aluminum. Aluminum for availability and expense is a preferred heat-conducting metal powder although the other known metals may be used.

As a covering of a roll or as a sheet product, this elastomeric mixture is used in a thickness of not less than one-sixteeth of an inch (1/16") and not greater than one-half inch ($\frac{1}{2}$"). As reduced to practice, it has been found desirable that the elastomeric mixture be about one-eighth of an inch in thickness ($\frac{1}{8}$"). As an applied covering, this mixture provides a resiliency and thermoconductivity for heat-sealing or welding of even or uneven thermoplastic films to themselves. This elastomeric mixture is compressible and causes the engaged films in the thicker areas to be pressed together to provide a continuous seal or weld of both thick and thin areas of heat-softened plastic films. This elastomeric mixture is used with heat and pressure for any unevenness of the plastic film thicknesses and to provide a heat transfer and pressure to the heated uniform and positive seal of two thin film layers together.

In addition to the above summary, the following disclosure is detailed to insure adequacy and aid in understanding of the invention. This disclosure, however, is not intended to be disguised by variations in form or additions. For this reason, there has been chosen a specific embodiment of the composition of material as first contacting layer for heated films and showing a preferred mixture for the elastomeric compressible mixture. This specific embodiment has been chosen for the purpose of illustration and description as shown in the accompanying drawing wherein:

Figure 1:
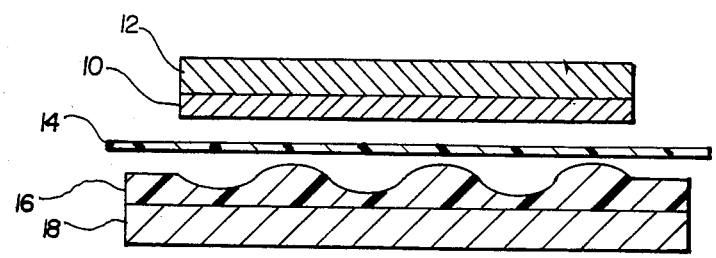
FIG. 1 represents a diagrammatic sectional side view showing an elastomeric heat-conducting mixture secured to a solid aluminum backup plate which is moved to retain and seal two or more plies of heated film or one ply of flat film to an uneven plastic material layer for the purpose of sealing these films.

The one sheet of drawings accompanying, and forming a part of, this specification discloses details of use for the purpose of explanation but details may be modified without departure from the concept and principles of the invention and the invention may be incorporated in other forms than shown.

DETAILED DESCRIPTION OF THE DRAWING

Figure 2:
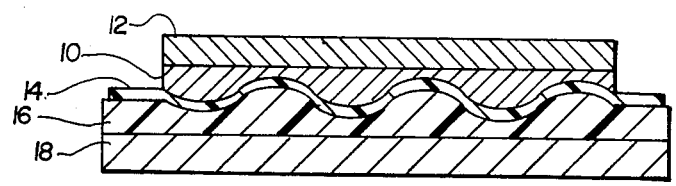
FIG. 2 represents a diagrammatic sectional side view of the apparatus of FIG. 1, with the flexible elastomeric compressible metallic mixture pressing a thermoplastic film against another film layer to form a hermetic, uniform, positive seal.

In FIGS. 1 and 2 it is to be noted that the elastomeric mixture material is identified as 10 and is secured to or fixed to a solid backup plate, preferably aluminum, and identified as 12. A flat or nearly flat film 14 is a thermoplastic film having characteristics that allow a continuous seal or weld to be made at those areas where and when the film is heated to a softened condition. An adjacent film is identified as 16 and may be uneven or even in thickness and may be one or two plies, with the layer 16 supported by a backup 18. Under heat and pressure, the elastomeric metal layer 10 compresses and compensates for any unevenness of the plastic plies so that heat conductivity is present and is similar to conventional metal components in other apparatus. The compressible metallic mixture is not only accommodating of irregularities, but the metallic portion provides heat conductivity to provide sealing of the interface of the film 14 and film 16. It is to be noted that the film or layer 16 is shown as having an uneven thickness. This illustration is exaggerated for the purpose of description. Often the unevenness is in the surface of the cooperating member 18 which may itself be irregular or may be slightly skewed. Whatever the cause, the elastomeric metal mixture member 10 is sufficiently resilient to accommodate the deformation encountered. This elastomeric mixture is particularly useful where and when cavities and/or embossures are made in a cooperating metal plate or roll as at 18.

In FIG. 2 the application of heat and pressure to the members of FIG. 1 is depicted. The flat film 14 has been moved sufficiently to accommodate the unevenness of the flexible film material layer 16 of FIG. 1. Pressure is applied so that the heated surfaces of the thermoplastic film materials 14 and 16 are brought into hermetic sealing condition. The heat through material 10 and backup 18 is sufficient to accommodate and provide sealing or welding of the contiguous films.

In FIGS. 1 and 2 the backup plate 12 and member 18 are shown as flat, but may be usable as a heat-conductive thermolaminating roller to provide optimum heat transfer at the nipping interface of rollers to provide welding of similar or dissimilar polymers together. It is also noted that the elastomeric thermoconductive metal and plastic mixture 10 may be usable as a means for removing heat and providing a heat sink to dissipate heat from one source to another. This thermoconductive elastomeric heat-conductive mixture material 10 provides for heat conductivity to another metallic or thermoplastic material for thermoforming application or operation.

The elastomeric metal heat-conductive mixture material preferably is about seventy-five (75) parts thermoconductive metal powder, about twenty-five parts (25) silicone rubber, and about two parts (2) tetrafluoro ethylene powder. As a powder, tetrafluoro ethylene is shown as two (2) parts and should not be less because it is very desirable that this elastomeric metal mixture 10 have release properties when polymer materials are in a heated condition. The durometer range of the above mixture can be varied by increasing the silicone rubber content to approximately fifty (50) parts silicone rubber and fifty (50) parts heat-conductive metal powder and two (2) parts tetrafluoro ethylene powder. It is to be noted especially that as the metal powder content is decreased, the conductivity is decreased proportionally.

As noted above, the preferred compound of elastomeric metal material may be as little as one-sixteenth (1/16") of an inch in thickness, but preferably is about one-eighth (⅛") of an inch. The maximum thickness is about one-half (½") inch. More than this thickness causes problems in conductivity. Thicknesses up to one-half inch (½") have been tried and found satisfactory.

The mixture of this invention is used particularly for welding or sealing heated thermoplastic films. Often the films are structured films that contain multiple plies, with each ply offering specific properties. This structured film is usually only a few mills in thickness, with one surface (the engaging surface) of the heated film sufficiently softened to weld to a like heated surface of a contiguous film. This other heated film may be of a dissimilar polymer, but when heat-softened is compatible for welding or sealing to the other contiguous film. Many of the structured films have polypropylene as one of the laminating surfaces, but other heat-softened films may be used and limitations to this polymer are not contemplated. Polymerized tetrafluoro ethylene powder as a portion of the composition is provided to insure a release agent and so that heat-softened film or films do not stick to the surface of the elastomeric mixture. Teflon, which is the trade name for Polymerized Tetrafluoro Ethylene, is a registered Trademark of F. I. duPont.

Silicone rubber is noted as a substantial portion of the mixture, but this is not to preclude the use of other elastomeric materials which are or may be developed. The selection of silicone rubber is that the resilient material does not change characteristics in the presence of heat. Many rubber and rubber-like components do not do well under heat such as over two hundred degrees Fahrenheit. Silicone rubber is specifically recited as it has been used successfully in forming the desired mixture. Polymerized tetrafluoro ethylene is also noted as a release powder to be used with this mixture, but it is also noted that tetrafluoro compounds using polypropylene and like polymers are of very recent availability and provide release properties to a degree of that of tetrafluoro ethylene and this is not to preclude the use of such materials as substitutes in the elastomeric mixture.

Terms such as "up," "down," "bottom," "top" and the like are applicable to the embodiment illustrating this invention in conjunction with the drawing. These terms are merely for the purpose of description and do not necessarily apply to the position in which the elastomeric compressible metallic mixture may be constructed or used.

While a particular embodiment of this mixture has been described, it is to be understood that the invention is not limited thereto and protection is sought to the broadest extent the prior art allows.

What is claimed is:

1. An elastomeric compressible mixture having the compressible properties of stiff rubber or rubber-like mixtures and heat-transfer characteristics and capabilities of metal such as aluminum, this mixture for use as a flat sheet or as a roll covering and as and when disposed in contiguous relationship with a heat-conductive metal backup, said mixture including:
   (a) at least two parts of a powder having release properties when and as heat above one hundred fifty degrees Fahrenheit is present, and
   (b) the remainder of heat-conductive metal powder in a range of fifty to seventy-five percent and of rubber or rubber-like material, the heat-conductive metal powder provided in this compressible mixture having a sufficient heat-transfer capability that heat from the metal backup is able to travel through said sheet or covering to an outer surface thereof to provide a desired surface temperature.

2. A mixture, as in claim 1, in which the rubber or rubber-like material is silicone rubber.

3. A mixture, as in claim 1, in which the elastomeric material applied to and as a contiguous portion of a backup member is made as a layer from one-sixteenth of an inch to a maximum of one-half inch in thickness.

4. A mixture, as in claim 3, in which the thickness of the elastomeric material is a thickness of about one-eighth inch.

5. A mixture, as in claim 1, in which the material is two percent polymerized tetrafluoro ethylene powder and is approximately seventy parts aluminum powder and twenty-five parts silicone rubber.

6. A mixture, as in claim 1, in which the metal powder is aluminum.

7. A mixture, as in claim 1, in which the metal powder is iron.

8. A mixture, as in claim 1, in which the metal powder is brass.

9. A mixture, as in claim 1, in which the metal powder is copper.

10. A mixture, as in claim 1, in which the metal powder is silver.

11. A mixture, as in claim 1, in which the metal powder is zinc.

12. A mixture, as in claim 1, in which the metal powder is tin.

* * * * *